United States Patent [19]

Abe et al.

[11] Patent Number: 4,459,620

[45] Date of Patent: Jul. 10, 1984

[54] COLOR VIDEO SIGNAL REPRODUCING APPARATUS

[75] Inventors: Fumiyoshi Abe, Zama; Hajime Takeuchi, Yokohama, both of Japan

[73] Assignee: Sony Corporation, Tokyo, Japan

[21] Appl. No.: 343,720

[22] Filed: Jan. 28, 1982

[30] Foreign Application Priority Data

Feb. 5, 1981 [JP] Japan .................................. 56-16066

[51] Int. Cl.³ ............................................ H04N 9/491
[52] U.S. Cl. ...................................... 358/312; 358/326
[58] Field of Search ............... 358/312, 313, 321, 327, 358/326; 360/10.1, 10.3

[56] References Cited

U.S. PATENT DOCUMENTS

| 4,100,567 | 7/1978 | Yoshinaka | 358/324 |
| 4,145,705 | 3/1979 | Yoshinaka | 358/326 |
| 4,296,443 | 10/1981 | Sakamoto et al. | 360/10.2 |

Primary Examiner—John C. Martin
Assistant Examiner—Erin A. McDowell
Attorney, Agent, or Firm—Lewis H. Eslinger; Alvin Sinderbrand

[57] ABSTRACT

A color video signal reproducing apparatus, such as a VTR, is capable of being operated in a normal speed reproduction mode, as well as in non-normal modes such as stop motion, slow motion, and fast motion. A rotary pick-up head on the apparatus is mounted, e.g., on a bi-morph leaf, for helical and transverse motion so as to scan recorded tracks accurately when the apparatus is in a non-normal mode. A first time base corrector processes the reproduced color video signal in composite form to provide a first corrected composite color video signal. A second time base corrector, formed of a Y/C separator for separating the composite video signal into its luminance and chrominance components, a luminance time base corrector unit for correcting time base errors in the separated luminance component, a chrominance time base comparator unit for correcting time base errors in the separated chrominance component and adjusting the phase of the color subcarrier thereof for standard color framing, and a combining circuit forms a second corrected composite color video signal. A speed detecting circuit, which can include a window comparator, detects whether the record medium is being transported at normal speed, and an electronic switch selects the first and second corrected composite color video signal depending upon whether the speed detecting circuit indicates a normal speed or a non-normal speed, respectively.

10 Claims, 4 Drawing Figures

FIG. 4A
CAPSTAN
ANGULAR
VELOCITY
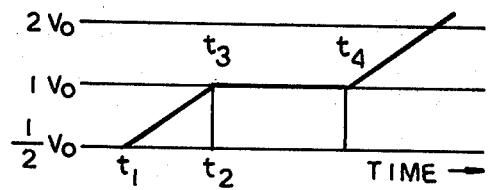
FIG. 4B
OUTPUT
VOLTAGE
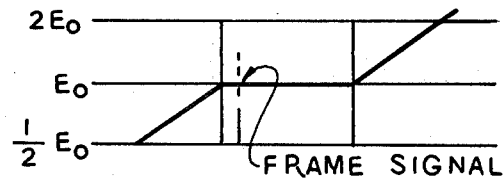
FIG. 4C
REPRODUCE
MODE
| NON-NORMAL | NORMAL | NON-NORMAL |
|---|---|---|
FIG. 4D
TIME BASE
CORRECTION
| SEPARATE Y AND C | COMPOSITE | SEPARATE Y AND C |
|---|---|---|

COLOR VIDEO SIGNAL REPRODUCING APPARATUS

BACKGROUND OF THE INVENTION

1. Field of the Invention

This invention relates to color video reproducing apparatus, such as a video tape recorder (VTR), and is particularly directed to a color video signal reproducing apparatus providing a time base corrected color video signal when operated in a normal-speed mode or in a non-normal speed mode, such as a stop-motion, slow-motion, fast-motion, or reverse mode.

2. Description of the Prior Art

Many color video signal reproducing apparatus are known which can accurately reproduce a recorded color video signal whether operated in a normal-speed reproducing mode or a non-normal-speed reproducing mode, such as stop motion, slow motion, fast motion, or reverse. One such apparatus, disclosed in U.S. Pat. No. 4,296,443, comprises a helical-scan VTR in which a pick-up head for scanning record tracks on magnetic tape is mounted for deflection in the direction transverse to the record tracks in each of which a field of video information is recorded.

In such a VTR, magnetic tape extends helically about at least a portion of the periphery of a guide drum, and is adapted to be moved or advanced in the longitudinal direction of the tape while at least a portion of the guide drum is rotated, and the magnetic pick-up head is supported on a bi-morph leaf or other deflectable support, which is in turn mounted on a rotating part of the guide drum. Thus, the magnetic head moves helically to scan each record track, and, owing to the deflectability of the bi-morph leaf, can follow the record tracks, even when the tape is advanced at a non-normal speed past the guide drum. Further, in the VTR disclosed in U.S. Pat. No. 4,296,443, an electrical drive signal for the bi-morph leaf is controlled to cause the head to jump to the next adjacent record track when the deflection of the bi-morph leaf approaches the physical limit possible therewith. By reason of such track jump, it is theoretically possible to effect correct slow-motion reproduction, fast-motion reproduction, still-picture reproduction, and even reverse-motion reproduction.

However, in non-normal reproduction modes, troubles arise by reason of time base variations of the reproduced signal. Such time base variations are caused mainly by the distance, measured in the direction along the record tracks, provided between the initial ends of the adjacent record tracks for achieving so-called H-alignment, and by the change occurring in the relative speed of the tape and magnetic head due to changeover of the speed of advancement of the tape. Other time base variations are caused, by example, by unavoidable fluctuations in the rotational speed of the magnetic head and in the speed of advancement of the tape past the guide drum. Of course, any fluctuations in the rotational speed of the magnetic head and the speed of advancement of the tape occurring during the recording operation also carry over into the reproduced signals to give rise to further time base variations.

The above-described time base variations can, for the most part, be corrected by means of existing time base correctors (TBCs), for example, as disclosed in U.S. Pat. Nos. 4,100,567 and 4,145,705.

Moreover, in low-speed reproduction, for example, reproduction at half of normal speed, the magnetic head is deflected to scan the same recorded track twice in succession. Also, in high-speed reproduction, such as reproduction at double normal tape speed, the magnetic head is deflected to scan only every other record track. Further, in still-frame or stop-motion reproduction, the same record track is scanned many times in succession. In any of such non-normal reproducing modes, time base correction is required to correct so-called jitter which occurs when an odd-field is substituted for an even video field, or vice versa.

In non-normal reproduction modes, the requirement to present a continuous chrominance component satisfying television system standards (i.e., color framing) gives rise to special problems. In particular, in non-normal modes wherein record tracks are scanned repeatedly or are skipped, special measures must be taken to ensure correct color framing, that is, to ensure that the color subcarrier or the chrominance component of the video signal is provided in correct phase.

As is well known, in the NTSC, PAL, and SECAM color television signal systems, the phase of the color subcarrier shifts in successive video fields. This occurs because of the need to ensure a correct frequency-interleaving relationship between the luminance component and chrominance component of a composite color video signal. The color subcarrier frequency is selected to have a special non-integral phase relationship with respect to the horizontal synchronizing frequency. For example, in the NTSC color television signal system, the color subcarrier-frequency $f_{sc}$ is related to the horizontal frequency $f_h$ as $$f_{sc} = \frac{455}{2} f_h.$$

Consequently, four television fields must occur before the color subcarrier signal exactly repeats itself in phase with respect to the horizontal synchronizing signal. In other words, a cycle of four consecutive fields can be considered as a single color frame, and cycles of four consecutive fields are required to maintain the continuity of the color subcarrier.

If color framing is disregarded in the reproduction of a recorded color video signal, the resulting picture brightness can become irregular, and the picture quality can otherwise deteriorate. Because in helical-scan reproduction each recorded track of video tape constitutes a single video frame, this color framing must be carried out with respect to at least four consecutive tracks.

Other standard color television systems have similar requirements. For example, in the SECAM system, a color frame is constituted by four consecutive fields. In the PAL system, because of the line alternations of the $B-Y$ color difference signal, a cycle of eight consecutive fields is required to constitute a single color frame.

Particular circuitry or forming the color frame lock signal is discussed in U.S. Pat. No. 4,115,800. For example, in a so-called C-format VTR, the color framing signal can be included in a control signal CTL, and a color frame servo operation can be performed on the basis of this signal CTL. Accordingly, the color frame lock signal is provided when the phase of the color subcarrier is locked according to a standard color frame cycle.

In order to achieve time base error correction of a reproduced composite video signal, it has been necessary to separate the reproduced video signal into its luminance and chrominance signal components, to correct any time base errors separately for each such component and then to recombine the corrected luminance and chrominance components. This has been required, at least in part, because correct color framing could not be easily carried out if the composite color video signal were time base corrected as an entity, i.e., as a composite signal. However, in digital time base corrector apparatus, such as those disclosed for example, in U.S. Pat. Nos. 4,100,567, and 4,145,705, wherein separate time base correctors are used for the luminance component and the chrominance component of a reproduced video signal, the phase of the subcarrier for the chrominance component can be adjusted for correct color framing when time base errors in the chrominance component are corrected.

While separate time base error correction of luminance and chrominance components has been adequate for non-normal reproduction, picture errors can occur during normal-speed reproduction. For example, if separate luminance and chrominance time base correction is carried out during normal-speed reproduction, the separate time base correctors impart different respective time delays to the luminance and chrominance components. Consequently, jitter, loss of color balance, and generally deteriorated picture quality can occur.

OBJECTS AND SUMMARY OF THE INVENTION

Accordingly, it is a principal object of this invention to provide an improved color video signal reproducing apparatus which avoids the drawbacks of the above-mentioned conventional apparatus.

More specifically, it is an object of this invention to provide an improved color video signal reproducing apparatus which can be operated in either a normal reproducing mode or a non-normal reproducing mode, which will provide proper color framing while in a non-normal reproducing mode, and which will provide time base correction of the reproduced color video signal without signal degradation characteristic of conventional such apparatus.

In accordance with an aspect of this invention, color video signal reproducing apparatus are provided for reproducing a composite color video signal recorded in successive parallel tracks on a record medium, the composite color video signal including a luminance component and a chrominance component carried on a color subcarrier. The apparatus comprises at least one rotary pick-up head for scanning the tracks on the medium and reproducing the composite color video signal recorded thereon; a tape transport system for transporting the medium relative to the rotary pick-up head at a transport speed selectable at a normal speed (corresponding to the speed at which the tracks were recorded on the medium) and at at least one non-normal speed different from such normal speed.

A first time base corrector is coupled to the rotary pick-up head for correcting time base errors in the reproduced composite color video signal to provide a first corrected composite color video signal. In this first time base corrector, the color video signal is processed in composite form.

A second time base corrector is provided for separately correcting the luminance and chrominance components of the reproduced composite color video signal. In this corrector, a luminance/chrominance separator separates the reproduced composite color video signal into its luminance component and its chrominance component, a luminance time base corrector unit corrects time base errors in the separated luminance component, a chrominance time base corrector unit corrects time base errors in the separated chrominance component and adjusts the phase of the color subcarrier for standard color framing, and a combining circuit combines the corrected chrominance and luminance components to form a second corrected composite color video signal.

A speed detecting arrangement is provided to detect whether the transport speed is substantially at the above-mentioned normal speed, and a switch arrangement is coupled to select the first corrected composite color video signal in response to detection by the detecting arrangement of the normal speed, but to select the second corrected composite color video signal otherwise.

The color video signal reproducing apparatus favorably provides a color frame lock signal to indicate that the color subcarrier of the reproduced signal is locked into its proper phase for color framing. In such case, the detecting arrangement can include a logic circuit with an output connected to the switch arrangement and an input coupled to receive the color frame lock signal such that the first corrected composite color video signal is selected only when the transport speed is substantially at the normal speed and the color frame lock signal is present.

The above and many other objects, features, and advantages of this invention wil become apparent from the ensuing description, when considered in connection with the accompanying drawings.

BRIEF DESCRIPTION OF THE DRAWINGS

FIGS. 4A—4D are waveform charts used in explaining the operation of the embodiment of FIG. 1.

DETAILED DESCRIPTION OF A PREFERRED EMBODIMENT

Figure 1:
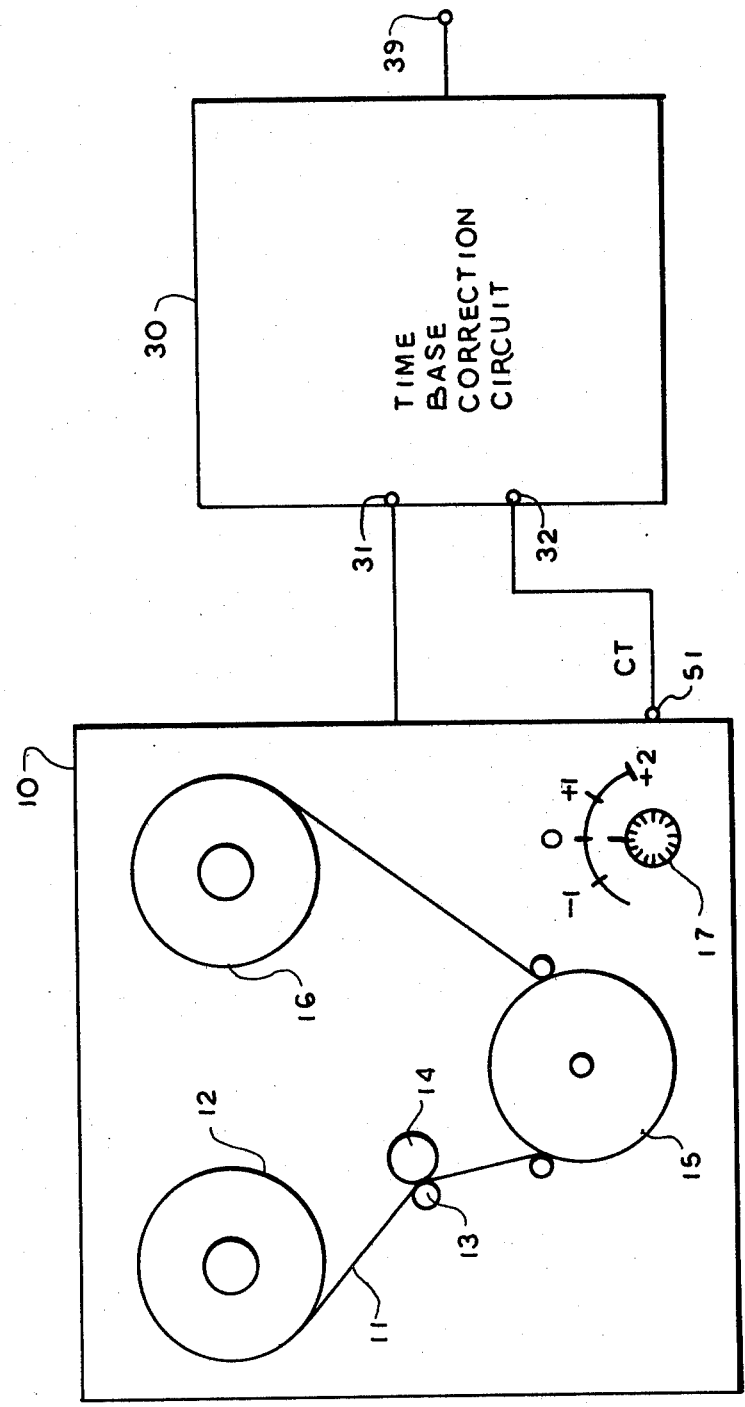
FIG. 1 is a schematic view of a color video signal reproducing apparatus according to one embodiment of this invention.
Figure 2:
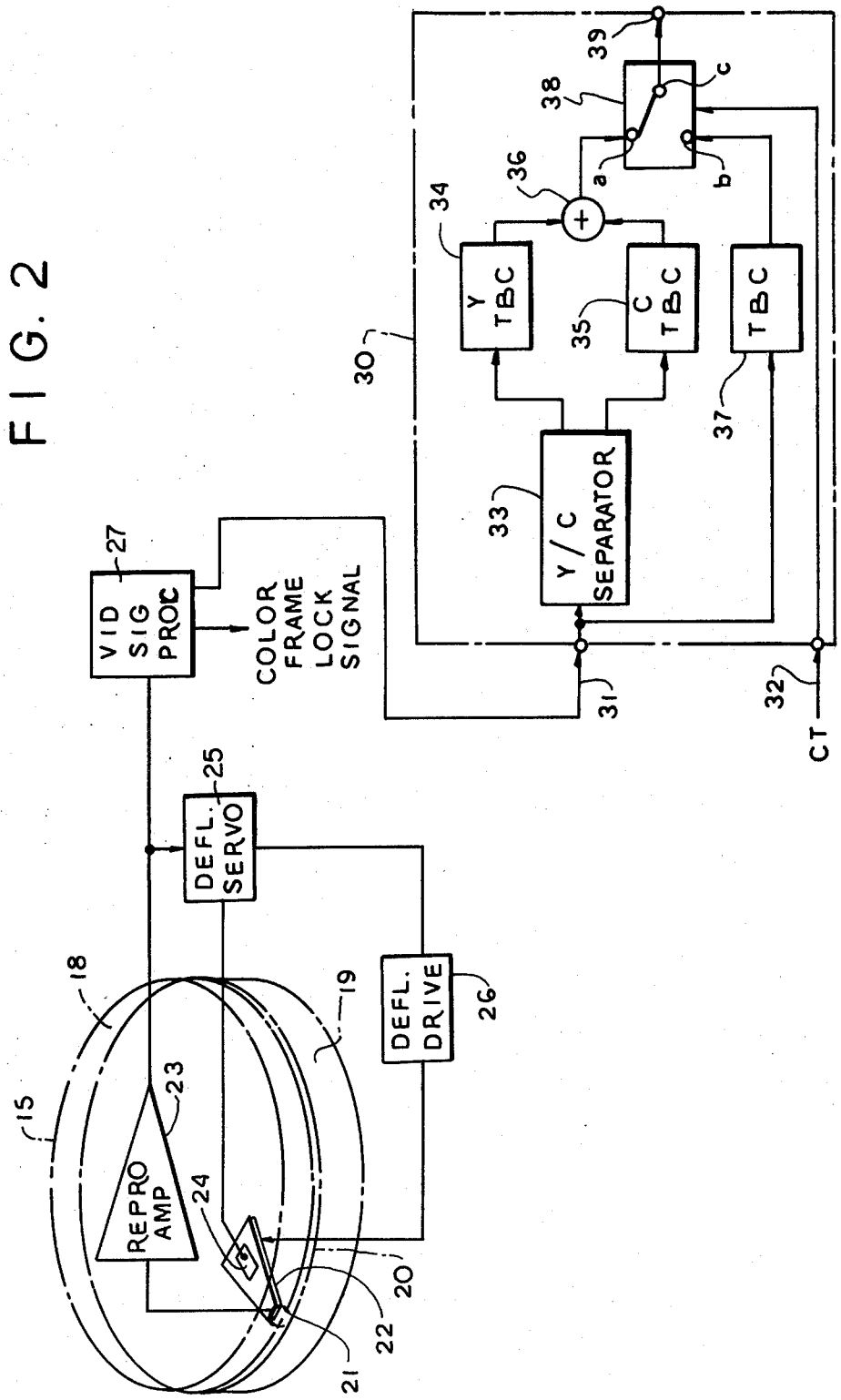
FIG. 2 is a schematic view of a portion of the apparatus of FIG. 1.

With reference to the accompanying drawings, FIGS. 1 and 2 illustrate apparatus according to one favorable embodiment of this invention.

In FIG. 1 there is shown a helical-scan video tape recorder (VTR) 10 on which a magnetic tape 11 extends from a supply reel 12, past a capstan 13 and associated pinch roller 14, and around a glide drum 15 to a take-up reel 16.

Also included on the VTR 10 is a manual speed control 17, which can be in the form of a manually rotatable wheel of the type disclosed, for example, in U.S. Pat. No. 4,139,872.

As better shown in FIG. 2, the drum 15 is formed of a rotatable upper drum portion 18 and a stationary drum portion 19 defining a circumferential slit 20 therebetween. A magnetic pick-up head 21 is mounted on a bi-morph leaf 22 which is, in turn, affixed to the upper drum portion 18 to rotate therewith. The tape 11 extends generally helically around the guide drum 15, so that the rotary motion of the pick-up head 21 can generally follow parallel slant record tracks on the tape 11 when the same is drawn past the guide drum 15 at normal speed, i.e., at the same speed at which the tracks were recorded on the tape 11. The bi-morph leaf 22 permits controlled movement of the head 21 in the direction generally transverse to the record tracks, so that the head 21 can follow the record tracks when the tape 11 is drawn past the guide drum 15 at a non-normal speed. Details of a favorable arrangement of the guide drum 15 are described in more detail in U.S. Pat. No. 4,296,443.

Video signals picked up by the pick-up head 21 are amplified in a reproducing amplifier 23. Information relating to the deflection of the bi-morph leaf 22 is transmitted from a strain gage 24 mounted on the leaf 22 to a deflection servo circuit 25 to which the reproduced video signal is also applied. This circuit 25 then provides a control signal to a deflection drive circuit 26 to cause the latter to apply a drive potential to opposite sides of the bi-morph leaf 22, so that the head 21 will follow a particular record track on the tape 11 even when the tape is transported at a non-normal tape speed.

The reproduced video signal is also applied from the reproducing amplifier 23 to a video signal processing circuit 27. This circuit 27 can contain a color subcarrier generator for providing the chrominance component of the reproduced signal with a standard color subcarrier, for example, according to the NTSC system. In this embodiment, the video signal processing circuit 27 provides a color frame lock signal to indicate that the color subcarrier generator is locked in to provide the color subcarrier in the proper phase for each color field (i.e., four field intervals).

A time base correction arrangement 30 has a video signal input 31 coupled to receive the composite color video signal from the signal processing circuit 27 and has a control signal input terminal 32 for receiving from the VTR 10 a control signal CT indicative of whether the tape 11 is being transported at normal speed. In the arrangement 30, a Y/C separator has an input coupled to the input 31 and a pair of outputs respectively providing a luminance component Y of the reproduced composite signal to a luminance time base corrector 34 and a chrominance component C thereof to a chrominance time base corrector 35. The latter time base corrector 35 corrects any time base errors in the chrominance component C and also adjusts the phase of the subcarrier thereof to ensure proper color framing.

A combining circuit 36 has inputs respectively coupled to the time base correctors 34 and 35 and an output providing a time base corrected composite video signal.

Another time base corrector 37 has an input coupled directly to the input terminal 31. Thus, the reproduced composite color video signal is processed therein in composite form and it provided at an output thereof as a corrected composite color video signal.

An electronic switch 38 has input terminals a and b respectively coupled to the combining circuit 36 and to the time base corrector 37 to receive the corrected composite color video signals therefrom. An output c of the switch 38 is coupled to signal output terminal 39, and the control signal input terminal 32 is connected to a control input of the switch 38.

Figure 3:
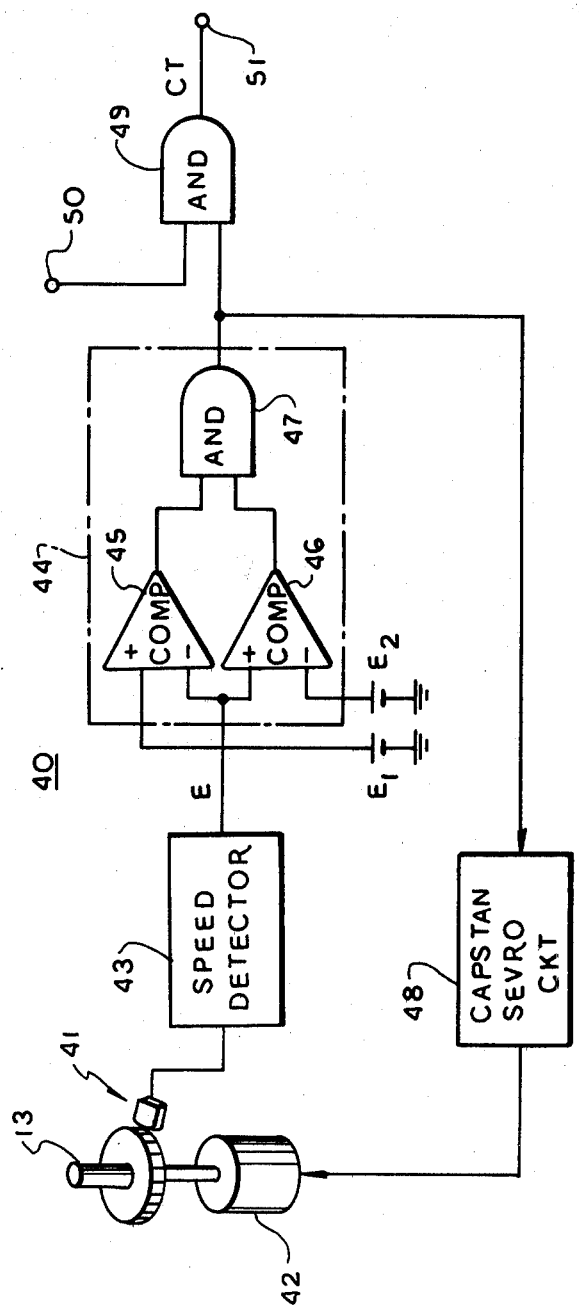
FIG. 3 shows speed detecting circuitry of the apparatus of FIG. 1.

FIG. 3 illustrates a portion of the VTR 10 responsible for providing the control signal CT. A control signal generator 40 generally includes a tachometer 41 associated with the capstan 13 for measuring the rotational speed of the latter as driven by a capstan motor 42. A speed detector circuit 43 coupled to the tachometer 41 provides a speed signal E whose level varies generally in proportion to the rotational speed of the capstan 13.

A window comparator circuit 44 is formed of a first comparator 45 having comparison inputs coupled to receive the speed signal E and a first reference level $E_1$, and a second comparator 46 having inputs coupled to receive the speed signal E and a second reference level $E_2$. The circuit 44 further includes an AND gate 47 having inputs connected to outputs of the first and second comparators 45 and 46, respectively. The values of the reference levels $E_1$ and $E_2$ for the window comparator 44 are selected as follows:

$$E_1 = E_0 + \Delta E_0$$

and $$E_2 = E_0 - \Delta E_0$$

where $E_0$ corresponds to the level of the speed signal E when the tape 11 is being transported at normal speed, and $\Delta E_0$ is, for example, several percent of $E_0$.

In this case, the output levels of the comparators 45 and 46 and of the AND gate 47 occur as shown in the following truth table:

|  | $E < E_2$ | $E_2 < E < E_1$ | $E_1 < E$ |
|---|---|---|---|
| comparator 45 | H | H | L |
| comparator 46 | L | H | H |
| AND gate 47 | L | H | L | where "H" indicates high level and "L" indicates low level.

As is apparent from the foregoing table, the output of the AND gate 47, and hence the output of the window comparator 44, is high only when the speed signal E is in the "window" defined by the reference levels $E_2$ and $E_1$.

The output of the window comparator 44 is fed to a capstan servo circuit 48. When a low output is supplied to the capstan servo circuit 48, the latter controls the speed of the motor 42 in conformance with the setting of the manually rotatable wheel 17. However, when a high output is applied to the circuit 48, the same servo circuit controls the motor 42 so that the latter is synchronized with an externally provided pulse, for example, derived from a control track on the tape 11, so that the tape transport speed is maintained substantially at the normal reproduction speed thereof.

A second AND gate 49 has one input coupled to the output of the AND gate 47 and another input coupled to a color frame lock input terminal 50, to which the color frame lock signal is applied. The output of the AND gate 49 is coupled to an output terminal 51 which provides the control signal CT to the control signal input terminal 32 of the time base correction arrangement 30.

As mentioned previously, the output of the AND gate 47 is high when the transport speed of the tape 11 is substantially equal to the normal transport speed thereof, and the color frame lock signal is provided at a high level as soon as color frame lock is achieved. Accordingly, the output of the AND gate 49 becomes high when the output of the AND gate 47 and the color frame lock signal are both high. In consequence, the control signal CT causes the electronic switch 38 to select the corrected composite color video signal provided from the time base corrector 37 only when the transport speed of the tape 11 is substantially at the normal speed thereof, and color frame lock has been achieved. In practice, color frame lock is achieved within the first few fields (i.e., tracks), so that the switch 38 will select the time base corrector 37 substantially immediately after the capstan 13 achieves the normal tape transport speed.

FIGS. 4A–4D illustrated the operation of the apparatus of this embodiment when the tape transport speed thereof is gradually changed.

Initially, as shown in FIG. 4A, at a time $t_1$, the capstan angular velocity is increased from a velocity $\frac{1}{2}V_0$ corresponding to one-half the angular velocity $V_0$ associated with normal tape transport speed, until a time $t_2$ at which the normal capstan angular velocity $V_0$ is achieved. Correspondingly, is shown in FIG. 4B the output voltage E increases from a value $\frac{1}{2}E_0$ to the value $E_0$. At time $t_3$ the apparatus is changed over from a non-normal mode to a normal reproduction mode, as shown in FIG. 4C, and shortly thereafter, at a time $t_3$, a color frame lock signal is provided. When, at a later time $t_4$, the capstan angular velocity is increased to a value $2V_0$ (FIG. 4A) corresponding to double normal tape transport speed. Accordingly, after time $t_4$, the value of the output voltage E increases to a value of $2E_0$ as shown in FIG. 4B, and the apparatus is changed over into a non-normal reproduced mode as shown in FIG. 4C.

As shown in FIG. 4D, from time $t_1$ to time $t_3$ the base correction is carried out separately for the luminance and chrominance components Y and C. However, at time $t_3$, at which the tape 11 is being transported at normal speed and the color frame lock has been achieved, the reproduced color video signal is processed in composite form for time base error correction.

Later, after time $t_4$ when the apparatus is once again in a non-normal reproduction mode, the luminance and chrominance components Y an C of the reproduced color video signal are processes separately for time base error correction.

As is apparent, because time base error correction is carried out separately for the luminance and chrominance components Y anq C during non-normal reproduction modes, proper color framing can be readily achieved. Moreover, because the reproduced composite color video signal is processed in composite form for time base error correction when the reproducing apparatus is in a normal reproduction mode, the resulting video picture will be free from jitter, color errors, or other picture deterioration problems characteristic of separate time base correction of the luminance and chrominance components.

Further, because the apparatus according to this invention changes over from separate to composite time base correction only after waiting a brief period for color frame lock to be attained, the rotational speed of the capstan motor 42 can be synchronized gradually without external manual synchronization. Consequently, the reproduced picture is free of any apparent unnatural time base shift.

While one preferred embodiment of this invention has been described hereinabove with reference to the accompanying drawings, it should be recognized that many possible modifications and variations thereof will become apparent to those skilled in the art without departing from the scope and spirit of this invention as defined in the appended claims.

I claim:

1. Color video signal reproducing apparatus for reproducing a composite color video signal recorded in successive parallel tracks on a record medium, said composite color video signal including a luminance component and a chrominance component carried on a color subcarrier; comprising
    rotary pick-up means for scanning said tracks on said medium and reproducing the composite color video signal recorded thereon;
    transport means for transporting said medium relative to said rotary pick-up means at a transport speed selectable at a normal speed corresponding to the speed at which the tracks were recorded on said medium and at at least one non-normal speed different from said normal speed;
    first time base corrector means coupled to said rotary pick-up means for correcting time base errors in said reproduced composite color video signal, with the latter being processed therein in composite form, to provide a first corrected composite color video signal;
    second time base corrector means for separately correcting the luminance and chrominance components of said reproduced composite color video signal including separator means for separating said reproduced composite color video signal into its luminance component and its chrominance component, luminance time base corrector means for correcting time base errors in the separated luminance component, chrominance time base corrector means for correcting time base errors in the separated chrominance component and adjusting the phase of the color subcarrier for standard color framing; and means for combining the corrected chrominance and luminance components into a second corrected composite color video signal;
    detecting means for detecting whether said transport speed is substantially at said normal speed; and
    switch means for selecting said first corrected composite color video signal in response to detection by said detecting means of said normal speed, and selecting said second corrected composite color video signal otherwise.

2. Color video signal reproducing apparatus according to claim 1, wherein said composite color video signal is formed of a succession of field intervals each constituted by a plurality of line interval, and the color subcarrier phase relative to said fields changes periodically so as to undergo a complete cycle at a predetermined plurality of at least four field intervals, and wherein each said track corresponds to not more than a single field; said apparatus further comprising color frame lock signal generating means providing a color frame lock signal when the phase of said color subcarrier is locked to said cycle of said predetermined plurality of field intervals.

3. Color video signal reproducing apparatus according to claim 2, wherein said detecting means includes window comparator means providing a comparator output signal having one sense when said transport speed is within a predetermined range containing said normal speed, but having another complementary sense when said transport speed is outside said range; and logic circuit means having one input connected to receive said comparator output signal another input connected to receive said color frame lock signal, and an output providing a detecting signal to said switch means to cause the latter to select said first corrected composite color video signal only when said transport speed is within said predetermined range and said color frame lock signal is present.

4. Color video signal reproducing apparatus according to claim 3, wherein said logic circuit means includes an AND gate.

5. Color video signal reproducing apparatus according to claim 1, wherein said detecting means includes window comparator means providing a comparator output signal having one sense when said transport speed is within a predetermined range containing said normal speed but having another, complementary sense when said transport speed is outside said range, and output circuit means providing a detecting signal to said switch means only when said transport speed is within said predetermined range.

6. Color video signal reproducing apparatus according to claim 5, wherein said transport means includes a drive motor coupled to advance said medium past said rotary pick-up means, and servo circuit means having an input coupled to receive said comparator output signal and an output coupled to control said drive motor.

7. Color video signal reproducing apparatus according to claim 5, wherein said detecting means further includes a speed detector providing a speed signal whose level varies with said transport speed; and said window comparator means includes a first comparator having an output and inputs coupled to receive said speed signal and a first reference level, respectively, a second comparator having an output and inputs coupled to receive said speed signal and a second reference level, respectively, said first reference level being higher than said second reference level, and logic gate means having inputs coupled respectively to the outputs of said first and second comparators, and providing a window comparator signal of one sense when the level of said speed signal is between said first and second reference levels, but otherwise providing a window comparator signal of another, complementary sense.

8. Color video signal reproducing apparatus according to claim 7, wherein said logic gate means includes an AND gate.

9. Color video signal reproducing apparatus according to claim 1, wherein said detecting means provides a detecting signal having one sense when said transport speed is substantially at said normal speed, but otherwise having another, complementary sense, and said switch means has a first input coupled to receive said first corrected composite color video signal, a second input coupled to receive said second corrected composite color video signal, an output, and a control input coupled to receive said detecting signal.

10. Color video signal reproducing apparatus according to claim 1, wherein said transport means includes manual selecting meansfor selecting, in addition to said normal speed, a stop motion speed, a fast motion speed, and a reverse speed.

* * * * *